A. THOMA.

METHOD AND APPARATUS FOR HANDLING COATED REINFORCING FABRIC.

APPLICATION FILED DEC. 27, 1910.

Reissued Feb. 21, 1911.

13,213.

Witnesses:
H. C. Bowser.
M. J. Spalding

Inventor:
Andrew Thoma,
by Geo. S. Maxwell
Attorney.

UNITED STATES PATENT OFFICE.

ANDREW THOMA, OF CAMBRIDGE, MASSACHUSETTS, ASSIGNOR TO THOMA CORPORATION, OF PORTLAND, MAINE.

METHOD AND APPARATUS FOR HANDLING COATED REINFORCING FABRIC.

13,213. Specification of Reissued Letters Patent. Reissued Feb. 21, 1911.

Original No. 937,391, dated October 19, 1909, Serial No. 473,239. Application for reissue filed December 27, 1910. Serial No. 599,637.

*To all whom it may concern:*

Be it known that I, ANDREW THOMA, a citizen of the United States, and resident of Cambridge, in the county of Middlesex and State of Massachusetts, have invented an Improvement in Methods and Apparatus for Handling Coated Reinforcing Fabric and Said Coated Reinforcing Fabric, of which the following description, in connection with the accompanying drawings, is a specification, like characters on the drawings representing like parts.

My invention relates to that general subject and type of invention set forth in U. S. Letters Patent No. 812,383, its object being, however, to eliminate the objectionable features of my previous invention and introduce certain other advantages, as will be more fully set forth in the course of the following description, considered with reference to the accompanying drawings, in which I have illustrated one form of mechanism for carrying out the invention.

Figure 1:
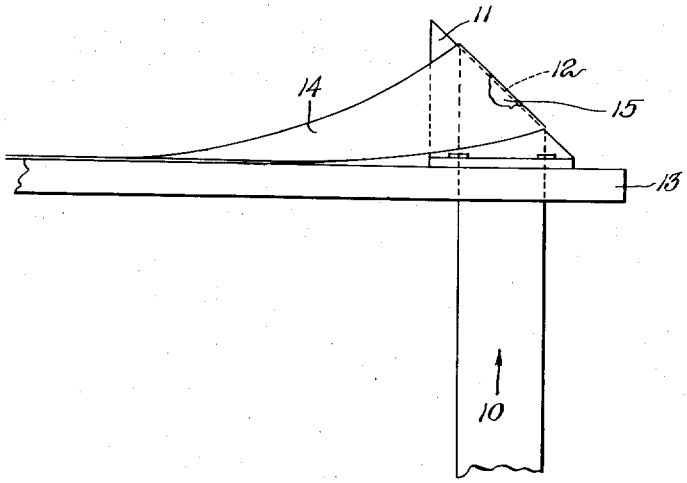
Figure 2:
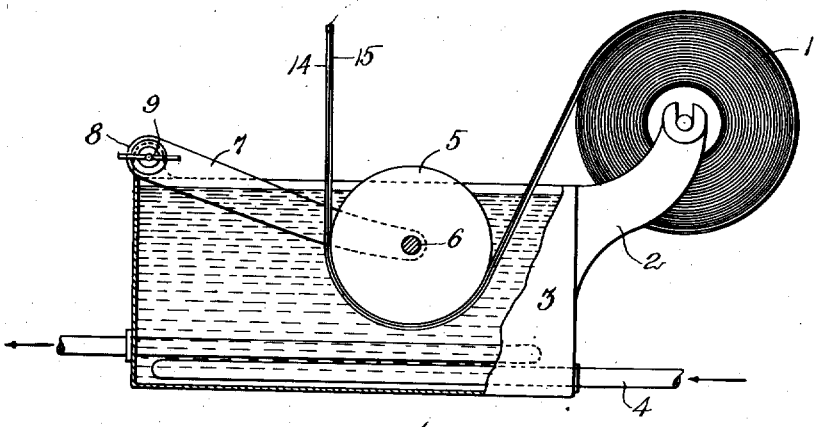

In the accompanying drawings, Figure 1 represents in side elevation the upper part of the mechanism, and Fig. 2 represents in end elevation the lower part of the mechanism for carrying out my invention.

My invention relates particularly to the reinforcing of leather innersoles for the production of the kind of innersoles commonly known in the market as "Gem" innersoles.

According to my previous method, the duck or reinforcing fabric was first coated with a solution or solutions of such a nature that the coated fabric became normally non-sticky, so that it could be rolled on itself without danger of the layers sticking together, the coating of said fabric, however, being capable of becoming sticky upon the application thereto of moisture and then dry heat, the moisture serving to soften the fabric and coating, and the dry heat serving to dry out the moisture from the coating so as to leave the latter simply sticky. This coated fabric has proved difficult and expensive to produce, particularly in view of the fact that in order to coat the material without developing the excessive stickiness during the coating thereof the coating material had to be applied in exceedingly thin layers, therefore necessitating a considerable number of layers in order to get the required thickness of coating. The softening or dissolving process of the gutta percha used often leads to overheating, and, especially in hot weather, it is very difficult to control the tendency of the individual coatings to peel or stick to the adjacent layer of fabric as the latter is being wound, thereby still further necessitating the application of the coating in very thin slight layers.

According to my present invention I am enabled to apply a heavy coating directly, even in a single coating if desired, and am able to have said coating exceedingly sticky as distinguished from normally non-sticky. My invention enables me also to employ the cheaper grades of gutta percha, which I find are most desirable, so far as the element of stickiness is concerned, said cheaper grades being naturally supplied with the desired resinous matter which is essential or at least advantageous in affording the requisite stickiness or adhesive qualities.

I find it advisable to use a compound containing additional resinous matter or other adhesive producing material in addition to the regular gutta percha, as set forth in my Patent No. 812,383 and as set forth in my applications Serial No. 407,558 now become abandoned and Serial No. 465,907 (now Patent 926,711, June 29, 1909), taking care, however, to omit all oily or fatty matter, which tends to neutralize or injure the sticky qualities of the coating, it being understood that one of the main objects of my present invention is to make it possible to employ an excessively sticky coating (of the kind mentioned and specially adapted to the reinforcing of gem innersoles) on the fabric which is to be packaged as an article of manufacture and shipped to shoe factories to be used as required. I have failed to find any commercially satisfactory cementitious coating not containing gutta percha, and accordingly I wish it understood that I preferably employ a gutta percha coating reinforced with resinous strong-sticking ingredients (this feature of being strong-sticking being very important), so that the coating is normally sticky and tacky, as distinguished from normally non-sticky, said coating being such that it is instantly responsive to a moderate heat which would not injure the cloth, so that, for example, when passed through hot water it becomes sufficiently soft to apply directly and instantly to the innersole, and will set as quickly upon cooling or being exposed to the air. The required moderate heat may be supplied in other ways and by other means than in the example given, but hot water has the advantage of accomplishing two objects at one time, viz. it softens or renders the fabric pliable, and it serves as a good medium for conveying to the coating the heat which is required for softening the coating. Of course, when it is not desired to render the fabric specially pliable, the water may be omitted and then the desired heat is applied in any other suitable manner.

I do not herein claim the cement, as that is duly claimed in my before mentioned applications. The features which render it possible and commercially practicable to use such cement as a coating of reinforcing fabric as an article of manufacture to be shipped in roll-form with impunity, and which constitute this part of my present invention, reside in applying the hot sticky cementitious coating thickly over one side of a strip of fabric, and then while it is still warm and sensitive applying to said coated side of the fabric another length of the same fabric preferably uncoated. In other words, I take two similar lengths of the reinforcing fabric, and as one length is being thickly coated with the hot sticky coating material the other length is being applied thereto, and in this condition the two lengths are wound up on each other with the coating between them, the uncoated length of fabric being promptly and efficiently stuck to the coated side of the coated length of fabric as the latter is being formed into a roll. One coating therefore supplies enough adhesive substance for two lengths of fabric in accordance with the requirements of reinforcing gem innersoles. The roll of double canvas of fabric is then stripped into narrow widths as required for the usual comparatively narrow innersoles, and is ready for the market. It will be evident that the cementitious coating is thoroughly protected so that it cannot get dirty and cannot deteriorate appreciably, because the canvas or duck on both sides of the coating excludes not only dust, lint, etc., but practically excludes the air, and hence prevents the cement from oxidizing. Arrived at the factory, if to be used in connection with water as preferred in my patent before mentioned, the roll 1 is placed on a support as indicated at 2 at one end of a tank 3 filled with water maintained hot by a steam coil 4 or any other suitable means, the free end of the fabric being led beneath a deflecting device herein shown as a wheel or roller 5 journaled on the laterally bent end or arm 6 of a lever 7 pivoted at 8 and held down by any suitable means as a thumb screw, latch, or other holding means 9. As the fabric passes through the boiling water in the tank 3 it is sufficiently soaked with or permeated by the boiling water to soften the coating between the two layers of fabric. This simply softens by means of its heat the sensitive coating, but does not wet it, which is expressly avoided, as the coating is efficiently protected from the hot water by the two layers of fabric and hence is simply acted upon by the heat and not by the moisture, so that it is softened sufficiently for easy separation of the two strips. The boiling water also tempers the fabric (by its moisture) as well as the coating (by its heat) by rendering them both pliable, the former being wet and limp and the latter becoming dry-sticky, *i. e.* sticky without the presence of extraneous moisture. This process secures an even heating to both strips, and obviates the danger of overheating (which was an ever-present and serious danger in my previous invention). The boiling water, although softening the coating, does not leave a moist film over said coating as was the case according to my previous invention, which necessitated an extra subsequent heating to overcome or dissipate said moisture.

My present invention not only secures proper softening with a minimum heat, but secures uniformity of wetting as well as of heating, and also obviates the danger of the fabric's absorbing the coating as was liable to be the case from the subsequent heating necessary according to my previous invention after the immersion. I regard the simultaneous heating and moistening of my present invention as an important feature in the preferred carrying out of my invention, impossible according to my previous invention. Heating the coated fabric subsequently to its previous immersion resulted in changing the conditions either of the fabric or its coated layer, or both, whereas by my present method there is no possibility of this defect. Having thus rendered the fabric pliable by means of the water and softened the intervening coating by means of the heat, the fabric is led upward as indicated at 10 between two similar plates 11, 12 secured to a table 13, said plates being herein shown as triangular in shape. The two layers of the fabric are then separated, one layer 14 being bent over the oblique edge of the plate 11 and pulled forward over the near side thereof, while the opposite layer or strip of fabric 15 is bent in an opposite direction over the oblique edge of the plate 12 and pulled forward over the far side of said plate, the two strips 14, 15 of fabric being pulled forward together with their coated sides upward along the table 13 in position to have the innersoles pressed down upon them in usual manner. The operator then cuts off the requisite lengths of canvas which have been thus stuck to the leather of the innersoles, and the latter are then passed forward to the gemming machine, all in usual manner.

It will be readily evident to those skilled in the art that my invention is capable of a wide range of embodiments and manners of use in reinforcing gem innersoles, within the spirit and scope of the claims hereinafter set forth. The main idea of the invention is the inclosing of a layer or coating of cement in between the two pieces or layers of duck in such amount and of such character of cement that it normally grips the two layers hard together in condition for shipping and rough handling when in strip form rolled up, for instance, and yet, when softened, the two layers may be separated and each will then have a proper and complete sticky coating for innersole reinforcing purposes. The kind of cement herein disclosed as preferable for said intervening copious layer readily responds to various softening agencies, and particularly to heat. Furthermore, by having the coating of cement inclosed between the layers or pieces of fabric as stated, it becomes possible to apply the cement-softening heat in connection with the fabric-softening moisture, but in any event the cement is first softened (whether moisture is used or not), and then the two pieces of fabric, which before could not be separated, are pulled apart so as each to retain its full complement of cement or tacky coating in condition for immediate reinforcing of the innersoles. Also, by having the intermediate layer or coating of cement held between and protected by the two outside layers of duck until the operator is ready to reinforce the innersoles, and then separating the two pieces of duck, each with its complement of said cement coating, the coating is much more sensitive and efficient than when applied to a single layer of fabric in the old way. This is partly due to the fact that the cement has been protected up to the very moment of use and partly to the mechanical separation or pulling apart of the previously integral cement body.

Having described my invention, what I claim as new and desire to secure by Letters Patent is:

1. The herein described method, consisting of uniting two pieces of reinforcing fabric for gem innersoles by means of a cementitious coating capable of being rendered temporarily quickly soft and sticky by extraneous means, applying said extraneous means to said united pieces, then separating the pieces in condition for immediate application to the innersoles, and then applying the pieces to the innersoles and securing them in place thereon by means of the temporarily soft and sticky coating.

2. The herein described method, consisting of uniting two pieces of reinforcing fabric for gem innersoles by means of a cementitious coating capable of being rendered temporarily quickly soft and sticky by heat, applying heat to said united pieces, then separating the pieces in condition for immediate application to the innersoles, and then applying the pieces to the innersoles and securing them in place thereon by means of the temporarily soft and sticky coating.

3. The herein described method, consisting of uniting two pieces of reinforcing fabric for gem innersoles by means of a cementitious coating capable of being rendered quickly soft and sticky by moist heat, applying moisture and heat to said united pieces, then separating the pieces in condition to receive the innersoles, and securing said pieces to the innersoles by means of said cementitious coating while the latter is still soft and sticky and the fabric is still under the influence of the moisture.

4. The herein described method, consisting of providing a coated fabric, adapted to reinforce innersoles, whose coating is capable of becoming quickly soft and extremely sticky in the presence of heat, simultaneously wetting the fabric on its uncoated side and heating, without wetting, the coated side, and then applying the innersole under pressure to the said dry-softened coated side.

5. The herein described method, consisting of uniting two pieces of reinforcing fabric by means of a cementitious coating capable of being rendered quickly soft and sticky by heat, immersing said united pieces in hot water so that the uncoated exposed sides of the pieces are wetted and the intermediate coating is simply heated, and then separating the two pieces from each other.

6. The herein described method, consisting of uniting two pieces of reinforcing fabric by means of a cementitious coating capable of being rendered quickly soft and sticky by heat, immersing said united pieces in hot water, removing the wet pieces from the water, and while the coating is still hot pulling said pieces apart, and then applying the fabric and innersole together under pressure with the innersole against the sticky softened coated side of the separated piece while said piece is still under the influence of the moisture.

7. The herein described article of manufacture, consisting of two independent pieces of gem innersole reinforcing textile fabric joined face to face by a cementitious coating capable of softening under the influence of softening means sufficiently to permit the pieces to be pulled apart but normally sufficiently unyielding to prevent the proper separation of said two pieces, said intermediate coating having a thickness and consistency capable of affording a coating for each separated piece temporarily sticky under the influence of said softening means for the short period requisite for the reinforcing process and ample to stick the separated piece in place as a reinforce for an innersole.

8. The herein described article of manufacture, consisting of two pieces of reinforcing textile fabric joined face to face by a normally sticky intermediate coating highly responsive to heat and of a thickness and consistency capable of affording an ample coating for each piece when said coating is softened by said heat and the pieces pulled apart.

9. The herein described article of manufacture, consisting of two pieces of reinforcing textile fabric joined face to face by a normally sticky intermediate gutta percha coating highly responsive to heat and of a thickness and consistency capable of affording an ample coating for each piece when said coating is softened by extraneous heat and the pieces pulled apart.

10. The herein described article of manufacture, consisting of two pieces of reinforcing textile fabric joined face to face by a normally sticky intermediate coating, said pieces being highly responsive to moisture and said coating being highly responsive to heat and of a thickness and consistency capable of affording an ample coating for each piece when said pieces and coating are softened by the moisture and heat and the pieces pulled apart.

11. The herein described machine, comprising a hot water tank, means to deliver thereinto a web consisting of two fabric strips united by a sticky intermediate coating, and means for automatically separating said two strips each with its proportion of said coating in a sticky condition as the web is pulled forward from said tank.

12. In an apparatus of the kind described, means to deliver a normally sticky coated fabric in a dry state, means to wet the fabric and simultaneously to heat and soften the coating without leaving on said coating a film of moisture, and means to deliver said fabric with its coated, sticky side in position to receive an innersole.

13. The herein described machine, comprising a hot water tank, means to deliver thereinto a web consisting of two fabric strips united by a sticky intermediate coating, and means for automatically separating said two strips each with its proportion of said coating in a sticky condition as the web is pulled forward from said tank, said separating means being constructed to permit the two strips to be pulled flatwise in the same direction.

14. The herein described machine, comprising a hot water tank, means to deliver thereinto a web consisting of two fabric strips united by a sticky intermediate coating, and means for automatically separating said two strips each with its proportion of said coating in a sticky condition as the web is pulled forward from said tank, said separating means being constructed to permit the two strips to be pulled flatwise in one and the same plane in the same direction.

In testimony whereof, I have signed my name to this specification, in the presence of two subscribing witnesses.

ANDREW THOMA.

Witnesses:
M. J. Spalding,
Edward Maxwell.